United States Patent [19]

Felix et al.

[11] Patent Number: 5,576,402
[45] Date of Patent: Nov. 19, 1996

[54] PROCESS FOR THE PREPARATION OF A MODIFIED POLYTETRAFLUOROETHYLENE AND ITS USE

[75] Inventors: Bernd Felix, Burgkirchen; Klaus Hintzer, Kastl; Gernot Löhr, Burgkirchen; Thomas Schöttle, Burghausen, all of Germany

[73] Assignee: Hoechst Aktiengesellschaft, Germany

[21] Appl. No.: 554,466

[22] Filed: Nov. 7, 1995

Related U.S. Application Data

[63] Continuation of Ser. No. 310,633, Sep. 22, 1994, abandoned.

[30] Foreign Application Priority Data

Sep. 25, 1993 [DE] Germany .................. 43 32 712.5

[51] Int. Cl.⁶ .................................................. C08F 2/00
[52] U.S. Cl. ................................. 526/229; 526/247
[58] Field of Search .................... 526/247, 206, 526/229

[56] References Cited

U.S. PATENT DOCUMENTS 3,629,219  12/1971  Esker .
3,819,594   6/1974  Holmes et al. .................. 526/247
3,855,191  12/1974  Doughty, Jr. et al. .
4,078,134   3/1978  Kuhls et al. .
4,078,135   3/1978  Sulzbach et al. ................ 526/247
4,262,101   4/1981  Hartwimmer et al. .......... 526/247
4,499,249   2/1985  Nakagawa et al. .............. 526/247
4,879,362  11/1989  Morgan ............................ 526/247
5,153,285  10/1992  Felix et al. .

FOREIGN PATENT DOCUMENTS 0041687  12/1981  European Pat. Off. ......... 526/247
0093404  11/1983  European Pat. Off. ......... 526/247
0226668   7/1987  European Pat. Off. ......... 526/247
0239192   9/1987  European Pat. Off. .
0296559  12/1988  European Pat. Off. .
0457255  11/1991  European Pat. Off. ......... 526/247
62-230804 10/1987  Japan .............................. 526/247

*Primary Examiner*—Joseph L. Schofer
*Assistant Examiner*—N. Sarofim
*Attorney, Agent, or Firm*—Connolly & Hutz

[57] ABSTRACT

If the employment of polymerization auxiliaries in ammonium form is avoided in the preparation of a polytetrafluoroethylene having a content of 0.02 to 1% by weight of units of a perfluoro-(alkyl vinyl) ether by the suspension process, a polymer which does not tend to discoloration on heating is obtained.

6 Claims, No Drawings

PROCESS FOR THE PREPARATION OF A MODIFIED POLYTETRAFLUOROETHYLENE AND ITS USE

This application is a continuation of Ser. No. 08/310,633 filed Sep. 22, 1994 abandoned.

The invention relates to a suspension polymerization process for the preparation of a modified polytetrafluoroethylene (PTFE) which suffers no discoloration when large moldings produced therefrom are processed by the preform sintering technique. "Modified" PTFE means that the tetrafluoroethylene (TFE) polymer contains low amounts of "modifying" comonomers, but the copolymers like homopolymeric PTFE—cannot be processed from the melt.

Molding powders of a polytetrafluoroethylene having a low content of a perfluoro-(alkyl vinyl) ether with an alkyl group of up to 5 carbon atoms are known in two forms, for example from U.S. Pat. No. 3,855,191 in the form which is not free-flowing and from U.S. Pat. No. 4,078,134 in the free-flowing form. The free-flowing form offers advantages in the metering and charging of processing machines, but the moldings from goods which are not free-flowing—as is also the case with non-modified PTFE—show significantly better mechanical and electrical properties.

By modification with the perfluoro-(alkyl vinyl) ether, the tendency to crystallize from the melt is inhibited, which means that the amorphous content is increased. The good mechanical properties, such as tear strength and elongation at break, can thereby already be achieved at significantly lower molecular weights than in the case of non-modified polytetrafluoroethylene.

The lower molecular weights of the modified products manifest themselves in an Ajroldi melt viscosity (U.S. Pat. No. 3,855,191, column 8) of about 1 to 100 GPas, while the non-modified polymers have values of more than 300 GPas, having comparably good mechanical properties.

As a result of this drastic reduction in melt viscosity, the properties of the moldings produced from these modified molding powders are improved. Since the particles of the molding powder fuse more easily, the moldings contain fewer pores and as a result have improved dielectric strength, and furthermore the creep resistance is virtually doubled. Above all, however, the weldability of the moldings is improved considerably.

Nevertheless, the moldings often show considerable discoloration during processing by sintering, and above all in the sintering of larger moldings, especially if molding powders which are not free-flowing are employed. This discoloration is usually not distributed homogeneously over the molding, but as a rule brown streaks occur. Since such plastics are employed only for high-quality goods, this inhomogeneous aspect is extremely undesirable, even if the technical properties are not noticeably impaired thereby.

Such discolorations have also already been found with non-modified PTFE and have been attributed to contamination by metal ions as a result of corrosion of the stainless steel polymerization vessels (U.S. Pat. No. 3,629,219, column 3, lines 7 et seq.). As a remedy, the addition of buffers for buffering corrosive acids is recommended there.

However, this effect cannot be decisive by itself in the case of polymers modified by perfluoro-(alkyl vinyl) ethers, since, even when such buffers are employed and in the case of polymerization in enamel vessels, the discolorations mentioned occur during the heat treatment of the moldings produced from the polymers thus obtained.

It has now been found that this adverse discoloration does not occur if the employment of ammonium compounds is substantially or preferably completely avoided during the polymerization. This finding is exceptionally surprising, since ammonium compounds are employed quite generally as initiators, activators, dispersing agents and buffers because of their good solubility. Thus, U.S. Pat. No. 3,629, 219 expressly recommends, in column 3, lines 31 to 37, the employment of ammonium buffers, initiators and activators to avoid discoloration of the sintered product.

It has furthermore been found that the modified polymers prepared on an industrial scale in the customary manner employing ammonium compounds cannot be freed adequately and reliably from the adhering ammonium compounds even by extensive washing. Indeed, intensive washing of the products often leads to an increase in the brown streaks. This effect is probably attributable to the fact that the residual amount of buffer is removed before the residual amount of monomers. On oxidation of these residual monomers, strong acids are formed, for example perfluoropropionic acid from perfluoro-(propyl vinyl) ether, which may corrode metal surfaces of the components of the processing plant and may thus entrain metal ions. In this case, the discolorations would then be attributable to contamination by metal—as described in U.S. Pat. No. 3,629,219.

According to the invention, the suspension polymerization is therefore carried out in a manner which is known per se, but in which the polymerization auxiliaries essentially are not employed in the form of ammonium salts. "Essentially" means that at least about 80%, preferably at least about 90%, of the cations of the chemicals added are not ammonium ions. Advantageously, ammonium compounds are avoided completely.

Preferred embodiments of the process according to the invention are illustrated in detail below.

The polymerization is carried out by the known suspension process at temperatures of 60° to 130° C., preferably 60° to 80° C., and under tetrafluoroethylene pressures of about 4 to about 25 bar, preferably 5 to 15 bar. The perfluoro-(alkyl vinyl) ether, preferably perfluoro-(n-propyl vinyl) ether (PPVE), is metered into the process in an amount such that the polymer contains 0.01 to 1% by weight, preferably 0.02 to 0.25% by weight, of ethermonomer units.

Suitable initiators are persulfates, the alkaline earth metal salts being possible in principle. However, the lithium, sodium and potassium salts are preferred because of their better solubility.

Preferred buffers are substances which are not strongly alkaline, since these can sometimes lead to a slight, although homogeneous, discoloration. The alkali metal mono- and diphosphates, alkali metal formates and trifluoroacetates are suitable. The alkali metal oxalates and hydrogen oxalates, in particular the sodium and potassium salts, which are not oxidizing under the conditions used, are preferred.

The addition of a buffer is not essential in many cases, but provides the advantage that corrosion of the components of the plant is reduced and the pH-dependent rate of dissociation of the initiator remains constant, which leads to a polymerization time which can be monitored and to better control of the molecular weight distribution.

Organic auxiliary chemicals, such as citric acid, or organic initiators, such as disuccinic acid peroxide, are not advantageous, since they can lead to discoloration of the product if not removed adequately.

The perfluoro-(alkyl vinyl) ether is preferably added such that the incorporation rate is essentially constant over the polymerization time. However, initial introduction of all the ether also leads to a product with good properties.

The addition of a dispersing auxiliary can advantageously be dispensed with in the process according to the invention. The occurrence of lumps, through which the reaction may become uncontrollable, is thus avoided.

The polymerization can also be carried out by the process known from U.S. Pat. No. 5,153,285, in which a mixture of TFE and inert gas is forced in before the polymerization and the total pressure of the mixture forced in is 5 to 50 bar, the concentration of the TFE in this mixture being 30 to 70 mol % and being kept in this range by appropriate topping-up during the polymerization.

The advantageous properties of the products obtained according to the invention can be seen from the following examples. The results are summarized in the form of a table, Examples 1 to 10 showing the conventional procedure and Examples 11 to 19 showing the process according to the invention. The examples contain repetitions with the same test parameters which show that no discoloration is achieved even with the known process—in individual cases. Products having an average PPVE content of 0.04 or 0.09% by weight are prepared (corresponding to customary commercial products).

The PPVE incorporation stated in the table is determined by IR spectroscopy by measurement of the absorption A at 994 and 2367 cm$^{-1}$ on a 100 μm thick film, in accordance with the following equation:

$$PPVE\ (\%\ by\ weight) = \frac{A\ 994}{A\ 2367} \times 0.95.$$

The standard specific gravity is determined in accordance with ASTM test standard D-1457-69.

Furthermore the tear strengths and elongations at break have been recorded in the table to demonstrate that the advantage according to the invention is not gained at the expense of disadvantages in these use properties. The procedure for the determination of the tear strength, elongation at break and brown discoloration is as follows:

a) washing of the crude polymer with deionized water, b) predrying in a fluidized bed at temperatures up to 130° C., c) after-drying for 4 hours at 220° C., d) grinding in an air jet mill to a $d_{50}$ value of about 20 μm, e) pressing under 350 bar to a cylindrical block weighing 13 kg of in each case about 208 mm height and diameter, f) sintering at 380° C. in accordance with a temperature program, g) peeling off a film 100 μm thick in 200 μm steps and h) visual evaluation of the color on the remaining block, which is peeled off to the extent of 90%, in accordance with the following scale:

| Rating | Discoloration |
|---|---|
| 0 | none |
| 1 | just detectable |
| 2 | clearly visible |
| 3 | tea-brown |

Specimens of the 100 μm thick film from the central zone of the block are used to determine the tear strength and elongation at break in accordance with DIN 53 455 (strip method).

EXAMPLES 100 l of water and the buffer substance stated in the table are introduced into a 150 l kettle (pressure container) with a stainless steel lining. The contents of the kettle are freed from atmospheric oxygen by purging with nitrogen and evacuating, several times, and are brought to the stated reaction temperature. The stated amount of PPVE is initially introduced into the mixture and TFE is forced in up to 10 bar. The reaction is started by rapidly pumping in the aqueous solution of the stated initiator.

The PPVE is metered in continuously at the rate stated in the table up to a conversion of about 95% of the TFE employed. The pressure is kept constant by continuous topping-up with TFE, and the reaction temperature is also kept constant. After conversion of the desired amount the addition of TFE is ended, the kettle is depressurized and residual monomers are substantially removed by alternate evacuation and purging with nitrogen twice. The contents of the kettle are cooled to room temperature and pumped off over a sieve. The crude polymer is washed twice with about 100 l of deionized water.

The washed crude polymer is predried in a fluidized bed at temperatures up to 130° C. After-drying at 220° C. for 4 hours follows. The dry crude polymer is then ground in an air jet mill to a $d_{50}$ value of about 20 μm, the content above 33 μm not exceeding 5% by weight. The finely ground product is pressed to a cylindrical block, as described above, the block is sintered and a film is peeled off.

The abbreviations in the table are as follows:

APS: Ammonium persulfate

AmCarb: Ammonium carbonate

KPS: Potassium persulfate

Na$_2$Ox: Disodium oxalate

K$_2$Ox: Dipotassium oxalate

TABLE

| Example | Temperature °C. | PPVE initially introduced in g | Metering rate g of PPVE/kg of TFE | Initiator Amount/ Type | Buffer substance Amount/Type | PPVE Incorporation % by weight | SSG density g/cm$^3$ | Tear strength N/mm$^2$ | Elongation at break % | Evaluation of brown streaks |
|---|---|---|---|---|---|---|---|---|---|---|
| 1 | 70 | 35 | 1.7 | 5.0 g/APS | 20 g/AmCarb | 0.087 | 2.171 | 37.7 | 680 | 1 |
| 2 | 70 | 35 | 1.7 | 5.0 g/APS | 20 g/AmCarb | 0.090 | 2.170 | 37.5 | 690 | 1 |
| 3 | 70 | 35 | 1.7 | 5.0 g/APS | 10 g/AmCarb | 0.094 | 2.171 | 35.6 | 675 | 2 |
| 4 | 70 | 70 | 0.6 | 5.0 g/APS | 20 g/AmCarb | 0.096 | 2.170 | 36.1 | 655 | 2 |
| 5 | 70 | 70 | 0.6 | 4.0 g/APS | 20 g/AmCarb | 0.098 | 2.171 | 36.8 | 715 | 2 |
| 6 | 70 | 60 | 0.7 | 4.0 g/APS | 20 g/AmCarb | 0.102 | 2.169 | 34.8 | 695 | 0 |
| 7 | 63 | 35 | 1.7 | 8.0 g/APS | 40 g/AmCarb | 0.100 | 2.169 | 34.5 | 715 | 3 |
| 8 | 63 | 35 | 1.7 | 8.0 g/APS | 40 g/AmCarb | 0.095 | 2.169 | 36.7 | 705 | 1 |
| 9 | 63 | 70 | 0.6 | 10.0 g/APS | 50 g/AmCarb | 0.115 | 2.168 | 37.9 | 680 | 2 |
| 10 | 63 | 70 | 0.6 | 10.0 g/APS | 50 g/AmCarb | 0.120 | 2.170 | 33.1 | 710 | 2 |

TABLE-continued

| Example | Temperature °C. | PPVE initially introduced in g | Metering rate g of PPVE/kg of TFE | Initiator Amount/Type | Buffer substance Amount/Type | PPVE Incorporation % by weight | SSG density g/cm$^3$ | Tear strength N/mm$^2$ | Elongation at break % | Evaluation of brown streaks |
|---|---|---|---|---|---|---|---|---|---|---|
| 11 | 70 | 35 | 1.7 | 4.5 g/KPS | 3.5 g/Na$_2$Ox | 0.092 | 2.170 | 32.8 | 705 | 0 |
| 12 | 70 | 35 | 1.7 | 4.5 g/KPS | 3.5 g/Na$_2$Ox | 0.089 | 2.171 | 33.1 | 710 | 0 |
| 13 | 70 | 35 | 1.7 | 4.5 g/KPS | 7.5 g/K$_2$Ox | 0.093 | 2.172 | 36.4 | 715 | 0 |
| 14 | 70 | 70 | 0.6 | 5.5 g/KPS | 9.0 g/K$_2$Ox | 0.098 | 2.173 | 36.6 | 690 | 0 |
| 15 | 70 | 70 | 0.6 | 5.5 g/KPS | 9.0 g/K$_2$Ox | 0.108 | 2.172 | 33.8 | 715 | 0 |
| 16 | 63 | 60 | 0.7 | 9.0 g/KPS | 7.5 g/Na$_2$Ox | 0.113 | 2.171 | 35.4 | 720 | 0 |
| 17 | 63 | 35 | 1.7 | 9.0 g/KPS | 7.5 g/Na$_2$Ox | 0.093 | 2.169 | 37.3 | 665 | 0 |
| 18 | 63 | 70 | 0.6 | 9.0 g/KPS | 9.0 g/K$_2$Ox | 0.120 | 2.164 | 34.5 | 690 | 0 |
| 19 | 63 | 70 | 0.6 | 9.0 g/KPS | 9.0 g/K$_2$Ox | 0.107 | 2.171 | 34.8 | 700 | 0 |

We claim:

1. A process for the preparation of a non-melt-processable tetrafluoroethylene polymer having a content of 0.01 to 1% by weight of perfluoro-(alkyl vinyl) ether units with 1 to 4 carbon atoms in the perfluoroalkyl chain, which comprises the step of reacting the monomers by suspension process in an aqueous medium containing at least one initiator and at least one polymerization auxiliary, said aqueous medium being essentially free of ammonium salts, the amount of tetrafluoroethylene and the amount of perfluoro-(alkyl vinyl) ether units being selected such that the resulting polymer is non-melt-processable.

2. The process as claimed in claim 1, wherein at least one said initiator is an alkali metal persulfate or an alkaline earth metal persulfate.

3. The process as claimed in claim 1, wherein the initiator is a lithium, sodium, or potassium salt or a mixture of said salts.

4. The process as claimed in claim 1, wherein the polymerization is carried out at 60° to 80° C.

5. The process as claimed in claim 1, wherein the tetrafluoroethylene is metered in under a pressure of about 5 to about 15 bar.

6. The process as claimed in claim 1, wherein the polymer of tetrafluoroethylene has a content of from 0.02 to 0.25% by weight of ether units.

* * * * *